United States Patent [19]
Powell

[11] Patent Number: 5,682,924
[45] Date of Patent: Nov. 4, 1997

[54] CLEAN AIR DUCTS AND METHODS FOR THE MANUFACTURE THEREOF

[75] Inventor: James A. Powell, Akron, Ohio

[73] Assignee: Steere Enterprises, Inc., Tallmadge, Ohio

[21] Appl. No.: 666,915

[22] Filed: Jun. 19, 1996

Related U.S. Application Data

[63] Continuation-in-part of Ser. No. 268,831, Jun. 30, 1994, Pat. No. 5,529,743.

[51] Int. Cl.⁶ ............................................. F16L 9/00
[52] U.S. Cl. ........................... 138/109; 138/155; 285/331
[58] Field of Search .................................. 138/109, 120, 138/155; 285/321, 236, 331, 242, 919

[56] References Cited

U.S. PATENT DOCUMENTS

| | | | |
|---|---|---|---|
| 4,423,892 | 1/1984 | Bartholomew | 285/321 X |
| 5,230,538 | 7/1993 | Kobayashi | 285/321 X |
| 5,509,669 | 4/1996 | Himmelberger | 285/321 X |
| 5,544,858 | 8/1996 | Rogers et al. | 285/321 X |
| 5,568,944 | 10/1996 | Kawasaki | 285/21.1 |

*Primary Examiner*—Patrick Brinson
*Attorney, Agent, or Firm*—Renner, Kenner, Greive, Bobak, Taylor & Weber

[57] ABSTRACT

A method for manufacturing a clean air duct (150) includes the steps of providing at least two tubular bodies (152, 156) having at least one open end (153, 157), each said open end having an annular ring (168, 168a) which terminates at an inwardly extending lip (166, 166a); closing an injection mold (210) around each annular ring; injecting a polymeric material into the injection mold to form a cuff (160) around the annular rings, thereby connecting the tubular bodies to form an air duct; opening the injection mold and, removing the air duct from the injection mold. Clean air ducts (10) for interconnecting an air filter to a throttle body comprise a blow molded tubular body (12) with at least one open end (14,16), the open end having an annular ring (72) which terminates at an inwardly extending lip (86) and, connecting means (30) molded around and secured to the annular ring, and the lip. Another clean air duct (150) comprises a pair of tubular bodies (152, 156), each tubular body having a pair of opposed ends (153, 154, 155, 157), at least one of the opposed ends of each tubular body having an annular ring (168, 168a) which terminates at an inwardly extending lip (166); and a cuff (160) connecting the annular rings and the inwardly extending lips.

16 Claims, 7 Drawing Sheets

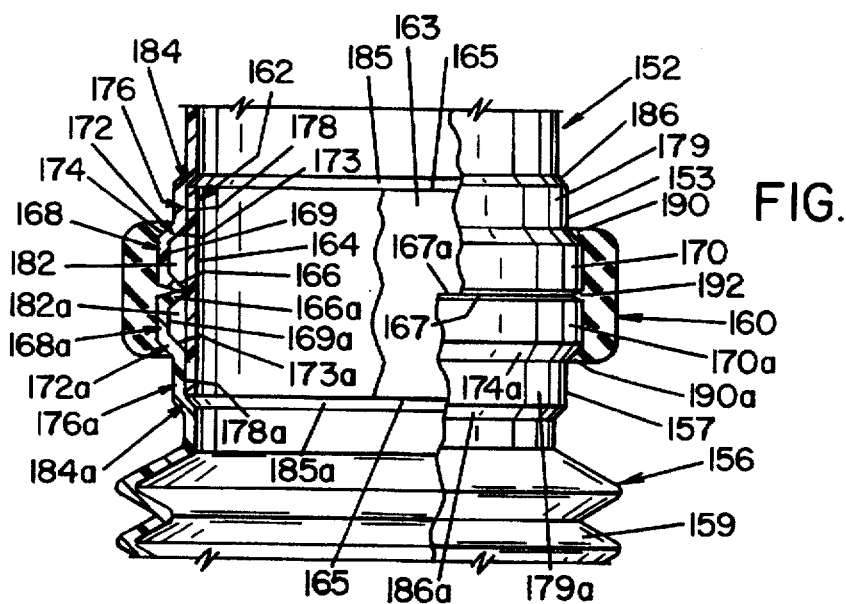

CLEAN AIR DUCTS AND METHODS FOR THE MANUFACTURE THEREOF

CROSS-REFERENCE TO RELATED APPLICATION

This is a continuation in part of application Ser. No. 08/268,831 filed Jun. 30, 1994, now U.S. Pat. No. 5,529,743, for clean air ducts and methods for the manufacture thereof.

TECHNICAL FIELD

The present invention relates in general to a clean air duct used to interconnect an automobile engine throttle body to an air filter. More particularly, the present invention relates to a method for manufacturing a clean air duct wherein a blow molding process is employed to form a flexible tubular body which is then inserted into an injection mold to have an interconnecting cuff molded thereon. Specifically, the tubular body is configured to provide a concentrated compressive sealing force during the injection molding process. More specifically, the concentrated compressive sealing force of one or more tubular bodies can be applied to an inserted sleeve or to an inserted mandrel, whereupon an over molded cuff or joint secures the plurality of tubular bodies to one another.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles with limited space in the engine compartment.

An alternative to using a one-piece rubber molded air duct is a three piece construction which utilizes a thermoplastic blow molded tubular body with injection molded rubber seals affixed to each end thereof. Although lighter and more compact than a rubber air duct, the three piece construction has its own inherent problems. The tubular body must be mechanically secured or adhesively bonded to the seals to effect a connection therebetween that can withstand the vibration and heat within an engine compartment. Furthermore the connection between the tubular body and the molded seal tends to break after the air duct has been repeatedly detached and re-attached to the air filter. A complete break in the connection between the tubular body and the seal renders the air duct unusable. Even a slight break between the two parts may allow unwanted impediments to enter the air intake system of the engine. Moreover, the additional manufacturing steps of independently molding the rubber seals and securing the seals to the tubular body adds additional cost to the air duct.

One approach to providing a more secure connection between the tubular body and the rubber seals affixed to each end is disclosed in U.S. Pat. No. 5,266,262 to Narayama et al. Narayama discloses a plurality of blow molded tubes having an interconnecting single flange thickness injection molded around one end of the tubes. More particularly, after the blow molded tube is removed from the mold and cooled, each end of the tube has its inner diameter modified so as to be coaxial with the tube's outer diameter. This method provides a tube with a reliable inner diameter into which a mandrel can be inserted so as to provide an effective seal therebetween during the injection molding operation. The Narayama patent also discloses a method wherein the injection mold is sized to seal around the outer diameter of the blow molded tube.

Although the Narayama patent is an improvement over prior types of air ducts, there are still several limitations. First, the method taught requires an additional manufacturing operation for modifying the diameter of the tube, which increases the cost of the air duct. Moreover, the boring or grinding machine which is employed to modify the inner diameter of the tube is likely to leave frangible pieces of plastic material that may enter the air intake system of the engine. Secondly, the patent reveals that projections are provided on the blow molded tube to more securely couple the injection molded part to the tube. Finally, the positioning of the blow molded tubular body within the injection molding cavity only restrains the movement thereof at two places, around the circumference of the tubular body and at an outwardly extending flange. This positioning permits the tubular body to "float" within the injection mold cavity, thereby allowing dimensional fluctuation of the finished air duct.

Although it is known to provide a rubber molded or combination molded air duct, the prior art does not disclose a method for manufacturing an air duct by injection molding end connecting means or cuffs over a blow molded tubular body that provides a less costly, more reliable interconnection between the two moldings. Furthermore, the prior art does not provide a method for manufacturing an air duct by injection molding end connecting means over a blow molded tube that positively ensures dimensional stability of the finished product. The present invention provides such a method and air duct, thereby increasing the reliability of the air duct manufacturing process and reducing the cost of the finished article.

Still another deficiency of the prior art is that there is no effective way of interconnecting molded tubular bodies made of dissimilar polymeric materials to one another with a similar or dissimilar polymeric material. Attempts to over-mold adjacent tubular bodies resulted in the molding compound crushing the tubular body and allowing the entry of material into the duct formed by the adjacent tubular bodies. There have also been attempts to use a dual extrusion process to obtain a single air duct made of two dissimilar materials and the inherent advantages thereof—one flexible section connected to one rigid section. However, this process has been found to be prohibitively expensive and unreliable in mass production. Dual extrusion air ducts are also problematic in that costly reaming operations are required which may leave debris that could enter the engine when the duct is installed. The present invention provides such a method and air duct, thereby increasing the reliability of air ducts formed by joining a plurality of tubular bodies to one another and reducing the cost of the finished article.

DISCLOSURE OF THE INVENTION

It is therefore an object of the present invention to provide a clean air duct with a blow molded tubular body and connecting means injection molded to the ends thereof.

It is another object of the present invention to provide a clean air duct that is light, sturdy and dimensionally stable.

It is yet another object of the present invention to provide a clean air duct used in conjunction with an air intake system of an engine that is easily attachable and detachable.

It is a further object of the present invention to provide a method for manufacturing a clean air duct that provides a cost savings when compared with other methods.

It is still another object of the present invention to provide a clean air duct that includes a plurality of tubular bodies made of dissimilar polymeric materials and a related method for the manufacture thereof.

It is yet a further object of the present invention to provide a support means within the tubular bodies to be joined to preclude collapse thereof as the joint or cuff is molded on to the bodies.

It is another object of the present invention to provide a clean air duct wherein the tubular bodies and the interconnecting cuff are provided without flash and without debris which would otherwise have to be removed by a secondary reaming or finishing operation.

At least one or more of the foregoing objects, together with the advantages thereof over known art relating to air ducts and manufacturing the same, which shall become apparent from the specification which follows, are accomplished by the invention as hereinafter described and claimed.

In general, the present invention provides a clean air duct for interconnecting an air filter to a throttle body comprising a blow molded tubular body with at least one open end, the open end providing an annular ring which terminates at an inwardly extended lip and, connecting means molded around and secured to the annular ring and the lip.

The present invention also provides a clean air duct, comprising a plurality of tubular bodies, each tubular body having a pair of opposed ends, at least one of the opposed ends of each tubular body having an annular ring which terminates at an inwardly extending lip and a cuff connecting the annular rings and the inwardly extending lips.

The present invention also provides method for manufacturing a clean air duct includes the steps of providing at least two tubular bodies having at least one open end, each said open end having an annular ring which terminates at an inwardly extending lip; closing an injection mold around each annular ring; injecting a polymeric material into the injection mold to form a cuff around the annular rings, thereby connecting the tubular bodies to form an air duct; opening the injection mold and, removing the air duct from the injection mold.

BRIEF DESCRIPTION OF THE DRAWINGS

FIG. 9 is a partial sectional view, taken substantially along line 9—9 of FIG. 8, of the air duct according to the alternative embodiment of the present invention;

FIG. 10 is a partial sectional view of the interconnecting cuff in another alternative embodiment;

FIG. 11 is a partial sectional view of an interconnecting cuff joining two tubular bodies;

PREFERRED EMBODIMENTS FOR CARRYING OUT THE INVENTION

Figure 1:
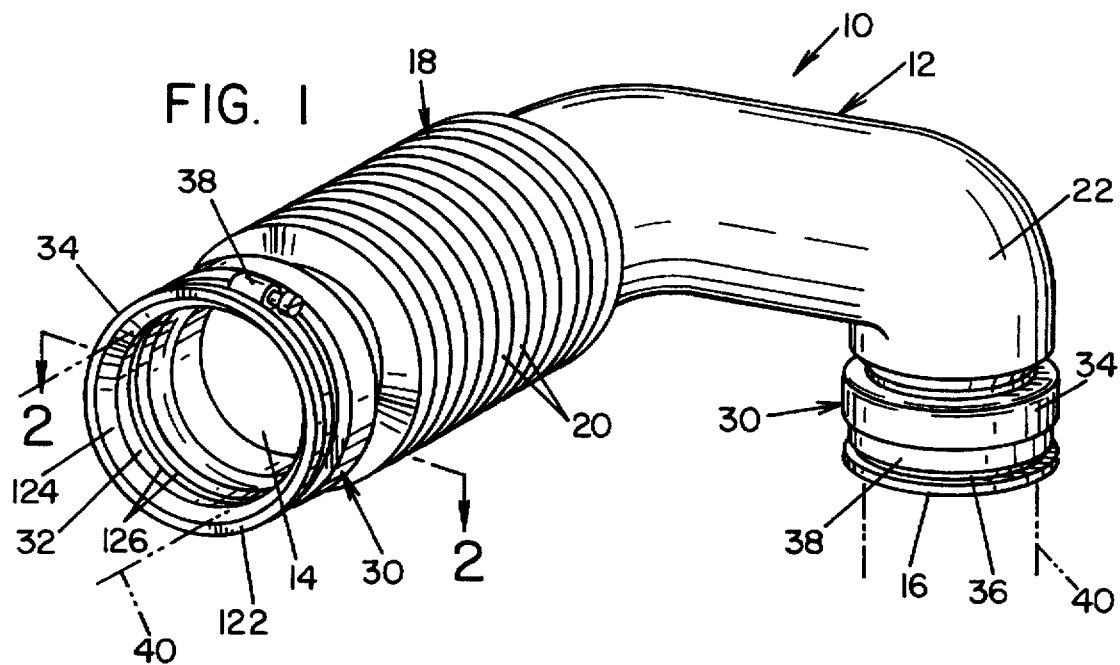
FIG. 1 is a perspective view of a blow molded tubular body with a cuff injection molded to both ends thereof, according to the present invention.

With reference to the drawings, and in particular to FIG. 1, an air duct according to the present invention is referred to generally by the numeral 10. The air duct 10 has a tubular body 12 with an open flex end 14 opposite an open angle end 16. Extending from the open flex end 14, the tubular body 12 has a flexible section 18 consisting of a plurality of sequentially spaced convolutions 20. Extending from the flexible section 18 is an angle section 22 which terminates at the open angle end 16. Although a flexible angular configuration is represented for the tubular body 12 shown in FIG. 1, it should be appreciated that any size, shape or configuration of a tubular body may be used for transferring a flow of air from one point to another, while still incorporating the elements of the present invention.

Figure 2:
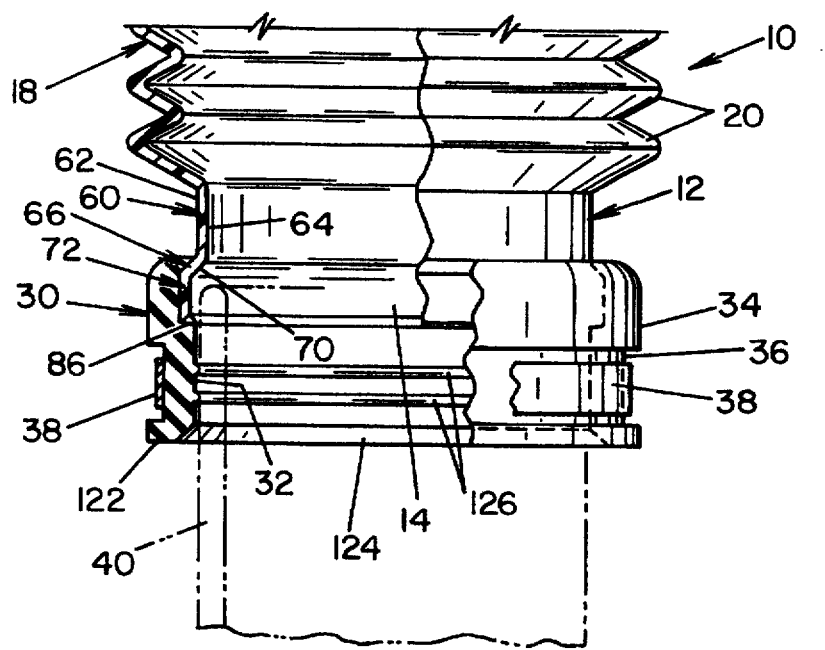
FIG. 2 is a partial sectional view, taken substantially along line 2—2 of FIG. 1, of an air duct according to the present invention showing the air duct secured to a port or other similar type receptacle.

Referring to FIG. 2, it can be seen that a connecting means 30 in the form of a cuff is secured around the open flex end 14. A similar connecting means 30 is also secured around the open angle end 16. The connecting means or cuff is provided to enable the air duct 10 to be attached or connected to the throttle body and to the air filter, or similar structure. The open flex end 14 and the open angle end 16 are configured in an identical manner. The cuff 30 has an interior surface 32 and an exterior surface 34. Disposed around the exterior surface 34 is an annular recess 36 for receiving an adjustable clamp 38. As is well known in the art, each cuff 30 is inserted onto an air filter port, throttle body, or other similar receptacle device, referred to by the numeral 40, and secured thereto by the adjustable clamp 38.

Figure 3:
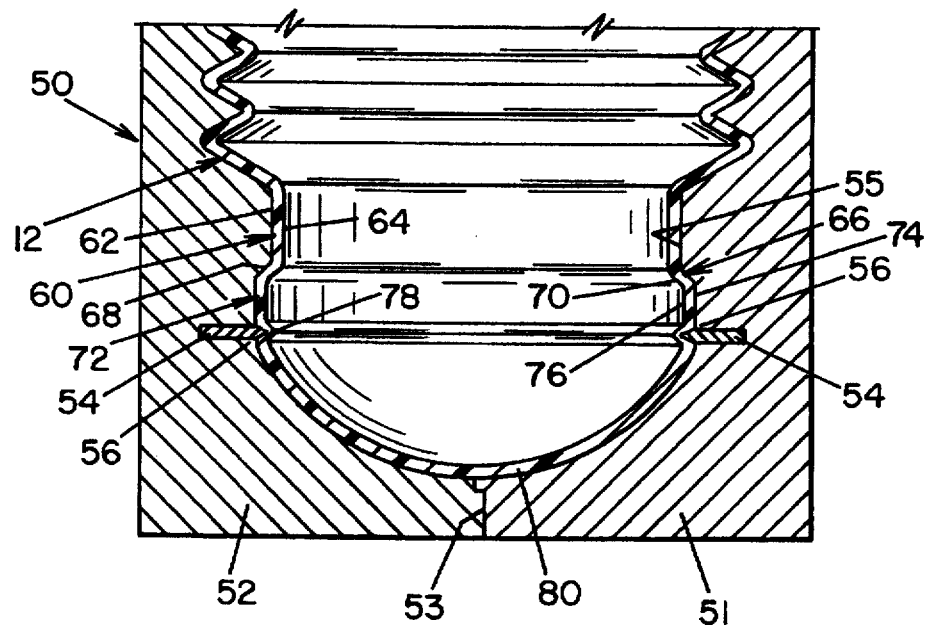
FIG. 3 is a sectional view of a blow mold with a blow molded tubular body disposed therein.

Referring now to FIG. 3, the tubular body 12 is formed in a blow mold, referred to generally by the numeral 50. The blow mold 50 comprises a right section 51 mateably engageable with a left section 52 at a parting line 53. When both left and right sections 51, 52 are closed, an embedded knife 54 will extend inwardly into the cavity 55 of the mold 50 at 56. Of course, there will be an embedded knife 54 at both ends of the blow mold 50.

Figure 4:
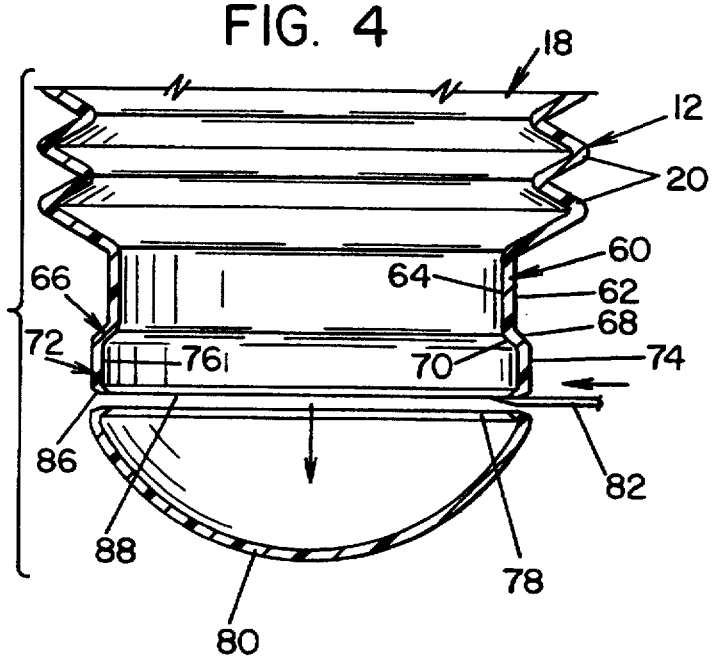
FIG. 4 is a sectional view of a blow molded tubular body wherein a bubble portion of the tubular body is removed by a knife.

As can be seen in FIG. 4, after the tubular body 12 is removed from the blow mold 50, a finishing operation is performed to the ends 14,16. In particular the tubular body has extending downwardly therefrom an annular neck 60, with an exterior surface 62 and an interior surface 64. Extending outwardly and downwardly from annular neck 60 is an annular shoulder 66, which has an exterior surface 68 and an interior surface 70. Extending downwardly from the annular shoulder 66 is an annular ring 72 which has an exterior surface 74 and an interior surface 76. Extending from the annular ring 72 is an inwardly directed apex 78 which was formed by the embedded knife 54. Also integral with the apex 78 is a bubble portion 80, which temporarily functions as an end-piece for the tubular body. It should be appreciated that the embedded knife 54 causes the apex 78 to have an appreciably thinner wall thickness than the remainder of the tubular body 12.

Figure 4A:
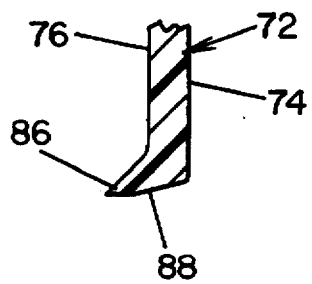
FIG. 4A is a detail sectional view of a lip of the tubular body after the bubble portion has been removed.

The thin wall thickness at the apex 78 permits a knife 82 to cut through the circumference of the apex so as to remove the bubble 80. With the bubble 80 removed the construction of the tubular body 12 is complete. As best seen in FIG. 4A, the knife 82 will cut the apex 78 so as to leave an inwardly extending lip 86 which has a lip surface 88 substantially perpendicular to the exterior surface 74 of the annular ring 72. It should be appreciated that the inner diameter of the lip 86 is less than the diameter of the interior surface 76 of the annular ring 72. Moreover, the inner diameter of the lip 86 is greater than the interior surface 64 of the annular neck 60. Additionally, the apex 78 will function as a guide for the knife 82 so as to provide a smooth even debris-free cut.

Figure 5:
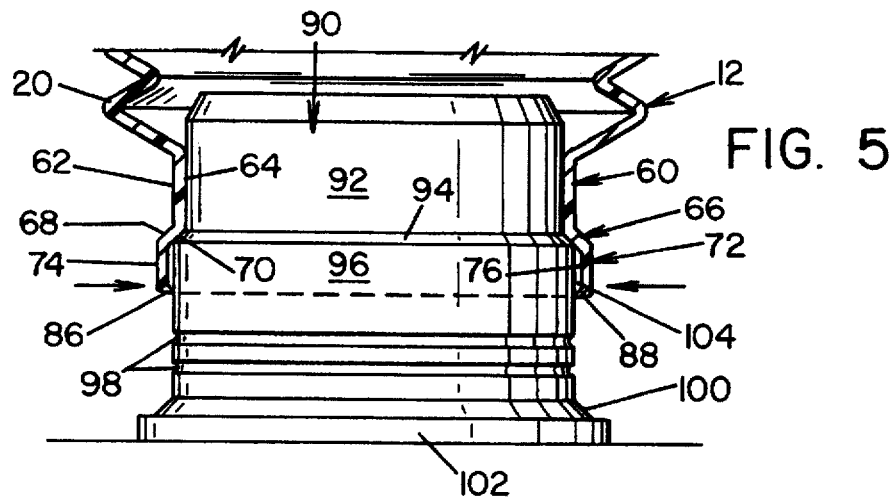
FIG. 5 is a partial sectional view of an injection molding core or mandrel inserted into an open end of the blow molded tubular body.

After the bubble portion 80 has been removed, the open ends 14,16 are obturated with a mandrel, generally designated by the numeral 90 as shown in FIG. 5, which can be facilitated by inserting the open end onto the mandrel. The mandrel 90, also referred to as the sealing core, functions to form the cuff interior 32 and positively position the tubular body 12 thereon. The mandrel 90 consists of a central core 92 that has a diameter equal to or slightly smaller than the annular neck interior surface 64. Extending outwardly and downwardly from the central core is a first shoulder 94. When the open ends 14,16 are inserted onto the mandrel 90, the first shoulder 94 will abut the annular shoulder interior 70. Extending downwardly from the first shoulder 94 is a second core 96. The second core 96 has a diameter larger than that of the inwardly extending lip 86. As such, when the open ends 14,16 are inserted onto the mandrel 90, the lip 86 will exert a compressive sealing force onto the second core 96. The second core 96 may have at least one annular groove 98 or none at all. Extending outwardly and downwardly from the second core is a second shoulder or taper 100, which functions as a lead-in during assembly, from which extends a sealing face 102. It should be appreciated that the area bounded by the second core 96, the lip 86, the annular ring interior 76, and the annular shoulder interior 70 forms an annular cavity 104.

Figure 6:
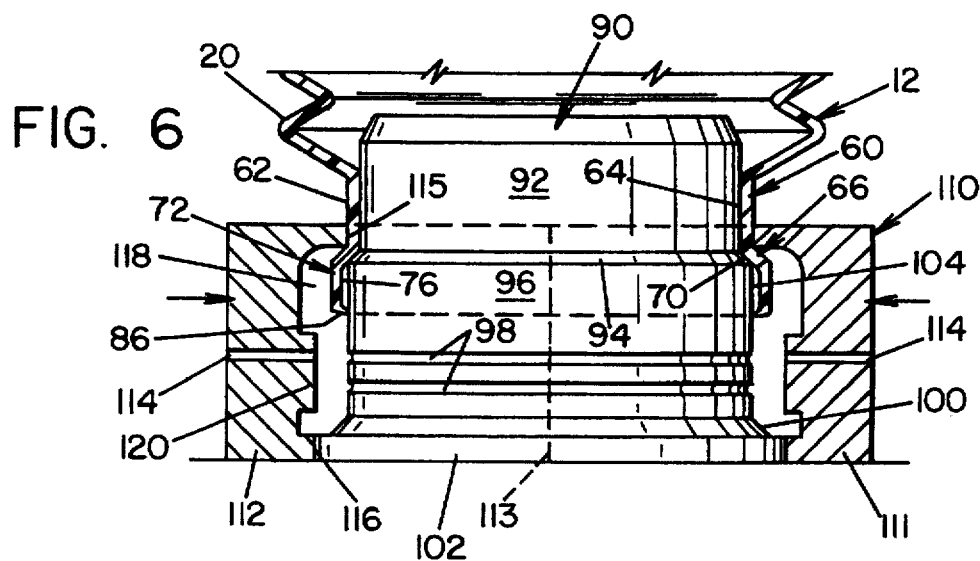
FIG. 6 is a partial sectional view of an injection mold for forming a cuff onto the end of the tubular body with the core or mandrel inserted therein.

Referring now to FIG. 6, the tubular body 12 with a mandrel 90 inserted into each end 14,16 is placed into a cuff mold 110. The cuff mold 110 comprises a right section 111 mateably engageable with a left section 112 at parting line 113. Contained within either or both right section 111 and left section 112 is at least one gate 114 for injecting molten polymeric material. The cuff mold 110 has a neck sealing surface 115 at one end thereof. The opposite end of the mold 110 has a front sealing surface 116. Therefore, as seen in FIG. 6, the neck sealing surface 115 is sized to slightly compress the annular neck exterior 62 which compresses the neck interior surface 64 against the control core 92. Likewise, the front sealing surface 116 is sized to fit around the sealing face 102. Therefore, the cuff mold 110 creates a compressive seal around the annular neck 60 and the sealing face 102 so as to form a cavity 118.

Figure 7:
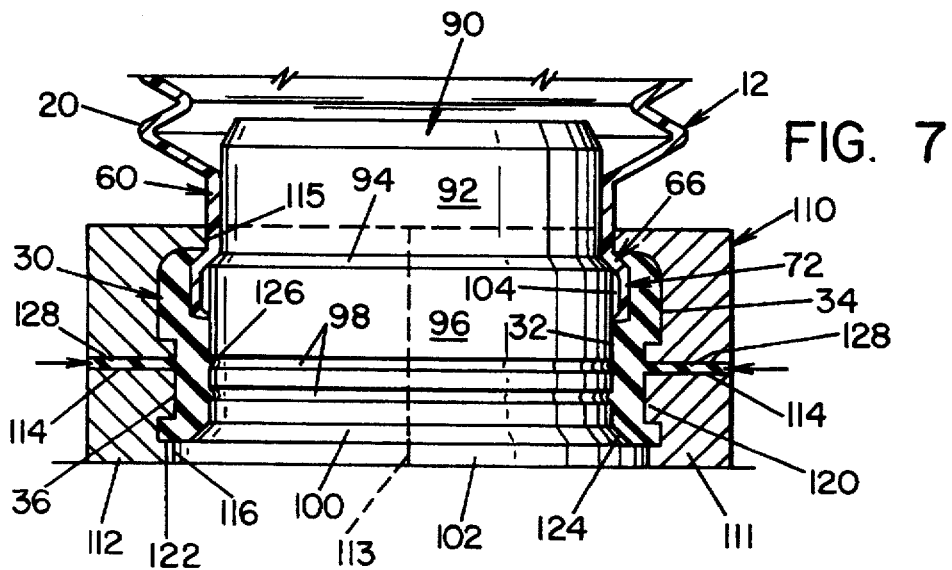
FIG. 7 is a partial sectional view of molding material injected into the cavity of the cuff mold so as to bond to the tubular body.

Molten polymeric material is injected through the gates 114 into the cavity 118 which forms the cuff 30. In particular, FIG. 7 shows that the cuff mold 110 has an annular ridge 120 which forms the annular recess 36 of cuff 30. Perpendicular to the exterior 34 is a front face 122 which is formed by the sealing face 102. Providing a transition from the front face 122 to the interior surface 32 of cuff 30 is a truncated conical section 124, which is formed by the second shoulder 100 of the second core 96. The cuff interior 32 has at least one annular rib 126 which is formed by the corresponding annular groove 98. The polymeric material remaining in the gate 114 after the injection step is a sprue 128. Although the gate 114 is shown integral with the annular ridge 120 it should be appreciated that the gate could be located anywhere in the cuff mold 110 to facilitate the injection molding process.

It will be appreciated by those skilled in the art that attempting to injection mold over a blow molded part is very difficult for several reasons. Primarily, the blow molded part tends to have an internal concave surface where the sections of the blow mold come together. This internal concave surface does not provide a uniform surface around which an injection mold can seal. If a uniform seal cannot be obtained around the blow molded part, the injection molding material will leak into any voids so as to prevent the injection mold from properly filling. Furthermore, if a high pressure level is not maintained within the injection mold cavity, the cavity 118 will not completely fill and a proper bond will not be obtained between the injection molded and blow molded parts.

To overcome the aforementioned problems, the present invention provides a novel method to ensure that an injection molded cuff is properly secured to a blow molded tubular body. In particular, the blow mold 50 is closed with the requisite amount of polymeric material therein and injected with air until a tubular body 12 is formed Although any polymeric material may be used for the tubular body 12, in the preferred embodiment, the tubular body will be made of a rubber modified polypropylene such as polypropylene/ethylene propylene diene terpolymer (EPDM) blends. Typically, the EPDM used will have a hardness of 40 on the Shore D scale, although other degrees of hardness or softness are not precluded. Other polymers that can be employed for instance include polypropylene, mica-filled polypropylene, polyphenylene oxide/nylon blends and mixtures thereof. The foregoing list is not to be construed as limiting but is rather merely exemplary of suitable materials. As best seen in FIG. 3, an embedded knife 54, which extends the circumference of the blow mold 50 into the cavity 55 extending apex 78. The embedded knife creates a reduced cross-sectional area at the apex 78 to facilitate removal of the bubble 80. After the tubular body 12 has cooled and taken its proper shape, the blow mold 50 is opened and the tubular body is removed.

Referring now to FIG. 4, it can be seen that a knife 82 is inserted into the apex 78, which functions as a guide, as to cut the bubble 82 away from the tubular body 12. Once the bubble 80 is removed from each end of the tubular body 12, the open flex end 14 and open angle end 15 are created. Upon removal of the bubble 80, a lip 86 inwardly extends from the annular ring 72. The lip ledge 88 provides a substantially perpendicular transitional area between the lip 86 and the annular ring exterior 74. It should be appreciated that the lip 86 and the lip ledge 88 provide a smooth uniform sealing surface that greatly minimizes the concave surface obtained from a typical blow molded part. Furthermore, the aforementioned cutting operation will not leave behind any burrs or frangible pieces of material as are created when a blow molded part is subjected to a boring or grinding operation. Thus, the possibility of a piece of material coming loose and entering the air duct 10 after it is installed on an air intake system is greatly reduced.

After the cutting operation, the open ends 14,16 are inserted onto the mandrel 90. As seen in FIG. 5, the central core 92 has a diameter equal to or slightly smaller than the diameter of the annular neck interior 64. The tubular body 12 is inserted onto the mandrel 90 until the annular shoulder interior 70 abuts or is seated upon the first shoulder 94. Concurrently, the lip 86, which has a diameter appreciably less than the second core 96, exerts a compressive sealing force around the diameter of the outer core as indicated by the arrows in FIG. 5. Additionally, since the diameter of the second core 96 is less than the diameter of the annular ring interior 76, the annular cavity 104 is formed between the lip 86 and the annular shoulder interior 70.

After the tubular body 12 is fully inserted onto the mandrel 90, both are inserted into the cuff mold 110 which is closed thereon. Referring now to FIG. 6, the neck sealing surface 115 seals around the annular neck exterior 62 in such a manner that the annular shoulder 66 is secured between the neck sealing surface 115 and the first shoulder 94. Furthermore, the diameter of the neck sealing surface is equal to or less than the diameter of the annular neck 60. The other end of the cavity 118 is formed by the front sealing surface 116 sealing around the sealing face 102 of the mandrel 90.

Referring now to FIG. 7, molten polymeric material is injected into the cavity 118 to form a cuff 30 integral with the tubular body 12. It should be appreciated that large internal pressures are generated within the cavity 118. By virtue of the aforementioned sealing arrangement around the annular neck 60 and the annular shoulder 62, the tubular body is prevented from "sliding" within the mold because of the internal cavity pressure. By positively securing the tubular body during the injection phase, the air duct 10 is manufactured within an acceptable overall length tolerance. It has also been found that even if a compressive sealing force is not provided initially between the lip 86 and the second core 96, the internal cavity pressure and the injected polymeric material function to compress the lip 86 against the second core 96 as long as the tubular body material is not excessively rigid. A tubular body made of rubber-modified polypropylene or the like has been found to be soft and flexible enough to allow an over-sized lip to seal around the second core 96.

Also formed during the injection mold process is the annular recess 36, a plurality of annular ribs 126 corresponding to the number of annular grooves 98, and a truncated conical section 124. Although any polymeric material may be used for the cuff 30, in the preferred embodiment, the cuff will be made of a thermoplastic elastomer (TPE) such as Santoprene®. Typically, the TPE used will have a hardness of about 55 on the Shore A scale. Furthermore, the injection molding material used to mold the cuff 30 is compatible with the blow molding material used to form the tubular body 12 and is generally softer to ensure sealing. Other suitable polymers include for instance rubber modified polypropylene, and TPE,s other than Santoprene® although again, the foregoing list is not to be construed as limiting but is rather merely exemplary of suitable materials. In other words, the combination of similar polymeric materials and the heat and pressure obtained during the injection molding process functions to make the cuff 30 integral with the tubular body 12 so as to form a one piece air duct 10. Where dissimilar polymeric materials are employed, a primer may be applied to the tubular body 12 prior to molding the cuff 30 to ensure a good connection therebetween.

After the cuff 30 has sufficiently cooled, the cuff mold 110 is opened and the air duct 10 is removed. Any sprue 128 that remains attached to the cuff is removed. It is to be understood that the cuff 30 could also be injected by a hot runner system, thereby eliminating sprue formation.

The finished air duct 10 is then ready for installation upon any receptacle which requires that a flow of air or other gaseous material be transferred from one point to another. First, the open angle end 16 is installed onto a port 40 or some other receptacle which has a diameter substantially equivalent to the diameter of the cuff interior 32. The truncated conical section 124 assists in the installation of the cuff 30 onto the mandrel 40. The adjustable clamp 38 is then tightened so as to compress the annular recess 36 and the annular ribs 126, if any, around the port 40. The annular ribs 126 function in a manner similar to O-rings to provide a substantially air-tight seal around the port 40. Likewise, the open flex end 14 is inserted onto a port 40 or other similar receptacle and secured thereto.

Therefore, by manufacturing an air duct 10 according to the present invention, the attachment, removal and re-attachment of the air duct to a port 40 is easily performed. Furthermore, due to the structural integrity of the one piece air duct 10, the cuff 30 will not become disengaged from the tubular body 12 after repeated cycles of detaching and re-attaching. Furthermore, the use of materials with dissimilar harnesses provide unique structural features heretofore unavailable in air ducts. The comparatively soft material used to make the cuff 30 allows repeated and long standing compressive forces to be applied thereto. The comparatively rigid material used to make the tubular body 12 prevents collapsing thereof. Both materials are selected to withstand the heat, chemicals, and vibration that the air duct 10 will be subjected to in proximity to an automobile engine.

Figure 8:
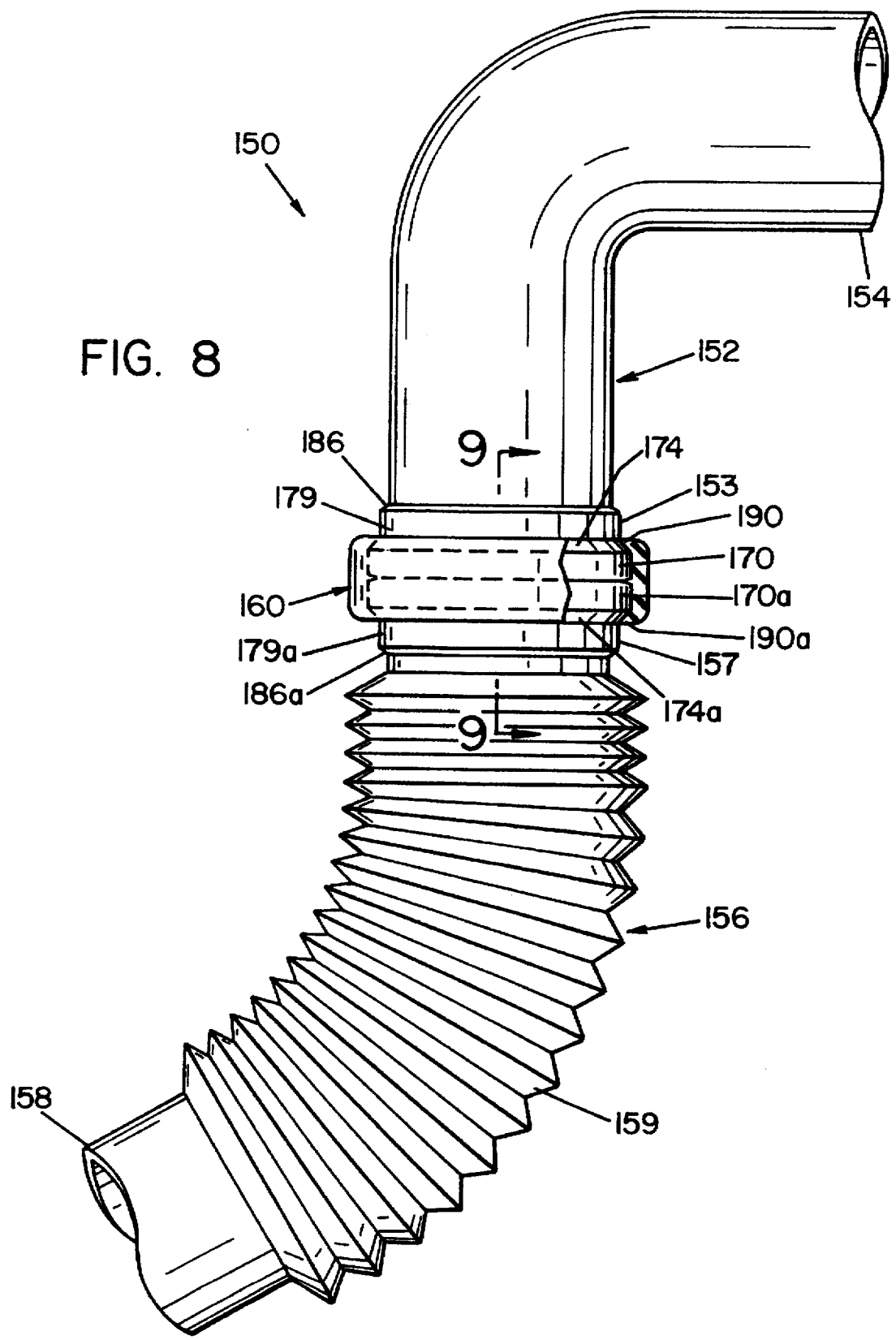
FIG. 8 is a top view of an air duct with an interconnecting cuff joining ends of a pair of tubular bodies, according to an alternative embodiment of the present invention.

With reference now to FIG. 8, an alternative air duct according to the present invention is referred to generally by the numeral 150. The air duct 150 includes a tubular body 152, which is typically made of a rigid polymeric material, that can either be straight or curvilinear as required by the placement of the air duct. The tubular body 152 has an open joint end 153 opposed by an open terminal end 154. Those skilled in the art will appreciate that the open terminal end 154 may be combined with a cuff 30, as presented in FIGS. 1–7. Connected to the rigid tubular body 152 is a flexible tubular body 156 which is made of a flexible polymeric material dissimilar from the rigid polymeric material provided in the tubular body 152. It will be appreciated that both tubular bodies 152 and 156 could be made with the same polymeric material if desired. The tubular body 156 includes an open joint end 157, that is opposed by an open terminal end 158. As before, the open terminal end 158 may also be combined with a cuff 30 as presented in FIGS. 1–7. The tubular body 156 may include a plurality of pleats 159 which allow further flexibility of the air duct 150.

An interconnecting cuff 160 holds both open joint ends 153 and 157 to one another. The interconnecting cuff 160 may be made of a similar or dissimilar polymeric material which allows for the joining of the two tubular bodies 152 and 156. It will be appreciated that any size, shape or configuration of the tubular bodies may be used for transferring a flow of air from one point to another as needed. This allows for easy mounting of the air duct 150 within an engine compartment. In other words, the rigid tubular body 152 is first mounted onto an appropriate port, such as an air filter, and then the flexible tubular body 156 is positionally adjusted to receive a connecting port, such as a throttle body. As will be discussed in further detail below, the air duct 150 employs the molding and sealing technology presented in FIGS. 1–7 to form a superior air duct heretofore unavailable in the prior art.

Referring now to FIG. 9, it can be seen that the tubular bodies 152 and 156 receive a support sleeve 162 in their respective joint ends 153 and 157. The sleeve 162 is hollow and in the present embodiment made of a rigid polymeric material. The sleeve 162 has an outer surface 163, an inner surface 164 and opposed end surfaces 165 which interconnect the outer surface 163 to the inner surface 164. Those skilled in the art will appreciate that the sleeve 162 is employed during the molding process that secures the interconnecting cuff 160 to the tubular bodies 152 and 156. The sleeve may be a rigid thermoplastic material, such as polypropylene or it can be metal.

As in the previous embodiment, the open joint ends 153 and 157 each have an inwardly extending lip 166. As seen in similar in construction end 157 is similar in construction to the open joint end 153 and where appropriate, identical structural elements are identified with an "a" suffix. For example, the open joint end 153 has the lip 166 and the open joint end 157 has the lip 166a. The lip 166 has a lip surface 167 which abuts or is proximately located near the lip surface 167a. As will be discussed in detail below, the lips 166 and 166a exert a compressive sealing force on the outer surface 163 of the sleeve 162 to preclude entry of the molding material employed during the injection molding of the interconnection cuff 160 into the air duct 150. In addition to preventing the entry of molding material into the air duct 150, the compressive seals of the lips 166 and 166a ensure that the cuff 160 is properly formed.

The lip 166 extends inwardly from an annular ring 168 which has an interior surface 169 and an exterior surface 170. Extending from the annular ring 168 is an annular shoulder 172 which has an interior surface 173 and an exterior surface 174. Extending from the annular shoulder 172 is an annular neck 176 which has an interior surface 178 and an exterior surface 179. The lip 166, the outer surface 163 of the sleeve 162, the interior surface 169 and the interior surface 173 form an annular cavity 182 which assists in the sealing process. Extending between the annular neck 176 and the tubular body 152 is a second annular shoulder 184 which has an interior surface 185 and an exterior surface 186. Likewise, a second annular shoulder 184a extends between the annular neck 176a and the tubular body 156. As those skilled in the art will appreciate, the interior surfaces 185 and 185a function to hold the sleeve 162 in place while the interconnecting cuff 160 is molded to the joint ends 153 and 157. In other words, the end surfaces 165 are positioned and held in place by the annular shoulders 184 and 184a, provided by opposed joint ends 153 and 157, respectively. It can be seen that the diameter of the annular ring 168 is at least slightly larger than the diameter of the annular neck 176 which has a diameter that is at least slightly larger than the diameter of the respective tubular bodies. 152, 156. In addition to holding the sleeves in place, the structure of the annular shoulders 184 and 184a and the annular necks 176 and 176a is such that the inner surface 164 is about the same diameter as the inner diameters of the tubular bodies 152 and 156. This allows for an unrestricted flow of air through the air duct 150.

The interconnecting cuff 160 includes opposed retaining ends 190 and 190a which bear upon the first annular shoulders 172 and 172a, respectively. It will be appreciated that the inwardly extending lips 166 cause the formation of a center ridge 192 which extends inwardly from the interior surface of the interconnecting cuff 160.

Referring now to FIG. 10, it can be seen that the interconnecting cuff 160 may be formed where the support sleeve 162 is employed and where the first annular shoulders 172, 172a extend into the tubular bodies 152 and 156, respectively. As can be seen, the inwardly extending lips 166 and 166a do not abut each other and are spaced apart from one another. In this embodiment the tubular bodies 152 and 156 do not provide a transitional neck and second shoulder and thus, the sleeve 162 is not captured by the tubular bodies as in FIG. 9. However, a center rib 194 is formed between the lips 166 and 166a and bears on the outer surface 163 of sleeve 162, holding the sleeve within the bodies, particularly where the sleeve is a plastic material, such as polypropylene. As those skilled in the art will appreciate, with the support sleeve 162 withdrawn, the flow of air through the duct 150 is maximized and the weight of the finished duct is reduced.

Referring now to FIG. 11, an alternative embodiment of the interconnecting cuff 160 is presented. As can be seen from the drawing, it will be appreciated that the inwardly extending lips 166 and 166a are abutted against one another. Accordingly, the molding process may be performed without inclusion of a supporting device. This embodiment has the advantage of not requiring the insertion and extraction of the sleeve, reduced weight of the air duct and an unimpeded flow of air therethrough. Molding material is precluded from entering the air duct 150 by the compressive sealing force of the lips 166 and 166a abutting against another. Again, as for FIG. 10, the joint end 153 and 157 terminate directly in the annular rings 168, 168a and first annular shoulders 172, 172a. Of course, if a sleeve is provided, it could be withdrawn from the duct upon completion of the molding of the interconnecting cuff 160, because there is no center rib (194 of FIG. 10) contacting the sleeve.

Figure 12:
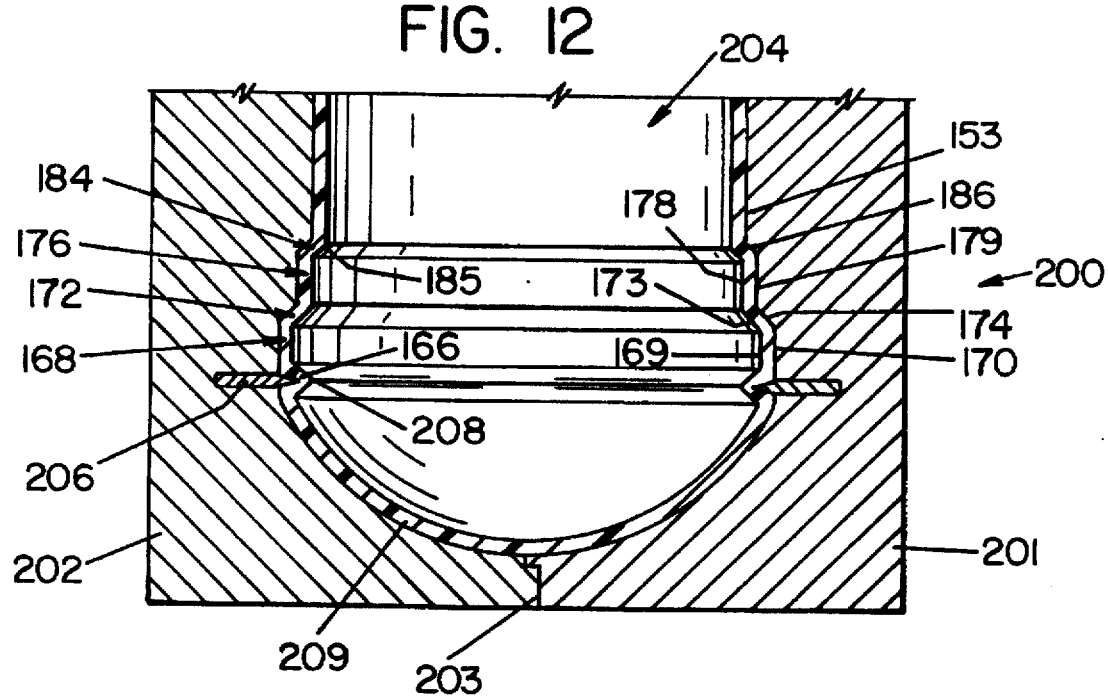
FIG. 12 is a partial sectional view of a tubular body blow mold having an embedded knife.

Referring now to FIG. 12, each of the tubular bodies and in particular the open joint ends 153 and 157 are formed in a blow mold, referred to generally by the numeral 200. The blow mold 200 comprises a right section 201 mateably engageable with a left section 202 at a parting line 203. When closed, the sections 201 and 202 form a cavity 204 which includes the desired structural features such as the inwardly extending lip 166, the annular ring 168, the annular shoulder 172, the annular neck 176, and the second annular shoulder 184. Also included in the blow mold 200 is an embedded knife 206 which forms an apex 208 between the inwardly extending lip 166 and a bubble 209. As described in the first embodiment, the cutting knife is inserted at the apex 208 to remove the bubble 209 from the remainder of the tubular body. Upon removal of the bubble 209, the inwardly extending lip 166 has a diameter which is typically equal to or less than the diameter of the sleeve 162 that is received therein. As described previously, this creates a compressive sealing force to preclude entry of molding material during the injection molding of the interconnecting cuff 160.

Figure 13:
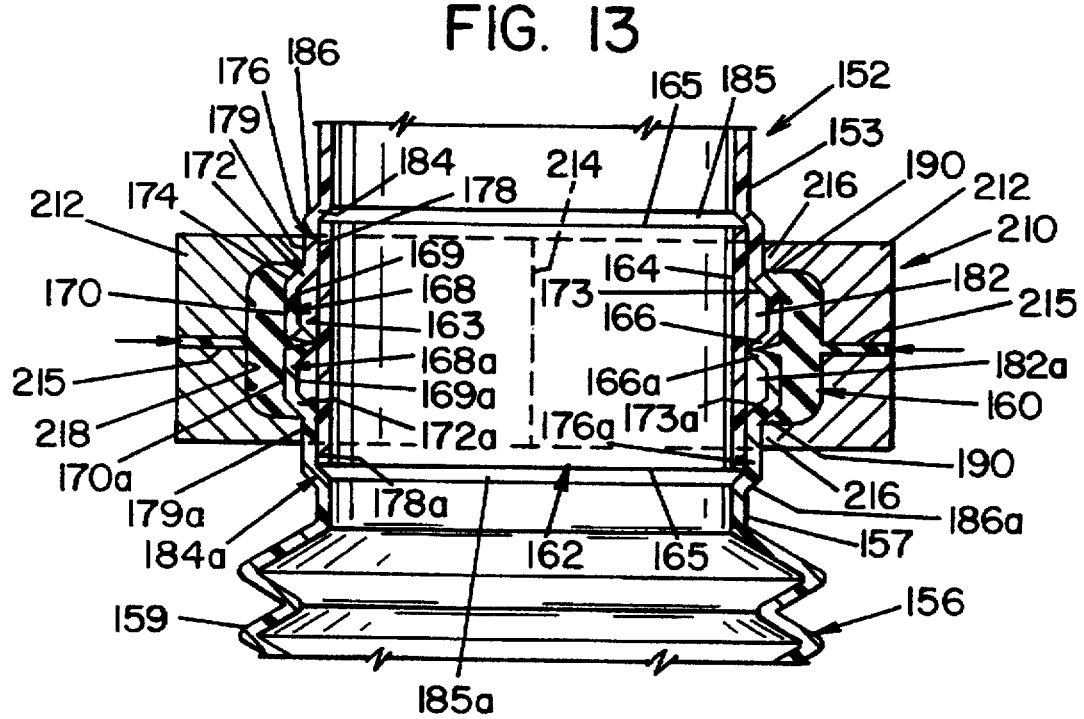
FIG. 13 is a partial sectional view of an interconnecting cuff injection mold received on the ends of opposed tubular bodies with a support sleeve inserted therein.

Referring now to FIG. 13, the open ends 153 and 157, which receive the appropriate support means, such as the sleeve 162, are inserted into an interconnecting cuff mold designated generally by the numeral 210. The interconnecting cuff mold 210 includes mating halves 212 that are mateably engageable at a parting line 214. Each mating half 212 includes a gate 215 which allows the entry of polymeric material into the cuff mold 210. It will be appreciated that gate 215 may be disposed at the parting line 214 or wherever conducive to the injection molding process. Each mating half 212 incudes a neck sealing surface 216 which seals the cuff mold 210 around the appropriate portion of the tubular bodies 152 and 156. In this embodiment, the neck sealing surface 216 seals upon the exterior surface 179 of the annular neck 176. When closed, the cuff mold 210 forms an interconnecting cuff cavity 218 which receives the appropriate injection molding material. After the molding material is injected into the mold and the appropriate cycle time has elapsed, the mold 210 is opened and the interconnecting cuff 160 is provided. It will be appreciated that the sealing surfaces 216 are sized to slightly compress the annular neck 176 which creates an air-tight cavity that ensures the proper molding of the interconnecting cuff 160. The cuff mold 210 forms the opposed retaining ends 190 that function to connect the tubular bodies 152 and 156 to one another.

To overcome the problems discussed in the background art, the alternative embodiment of the present invention provides a novel method to ensure connection of two dissimilarly shaped tubular bodies manufactured of dissimilar polymeric materials. As discussed in the first embodiment, the tubular bodies and the interconnecting cuff can employ various polymeric materials that are found advantageous to the manufacture thereof and for installation in an engine compartment or other similar environment. Where dissimilar materials are used, a primer may be applied to the tubular bodies 152 and 156 prior to molding the cuff 160 to ensure a good connection therebetween.

Figure 14:
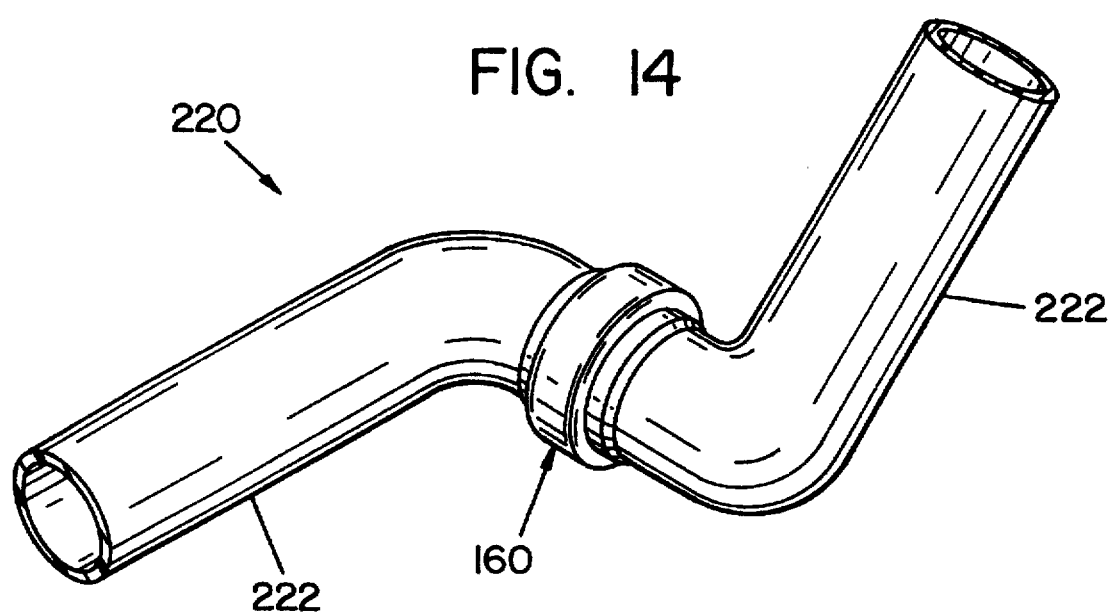
FIG. 14 is a perspective view of an interconnecting cuff joining exemplary tubular bodies which preclude insertion of a support mandrel underneath the interconnecting cuff region.

Referring now to FIG. 14, an angular air duct, generally designated by the numeral 220, is presented. An interconnecting cuff 160 joins angular extensions 222 employing the above-described methodology. As will be appreciated by those skilled in the art, the angular air duct 220 presents an embodiment which precludes the use of mandrels to provide the necessary support to mold the interconnecting cuff 160. As such, the advantages of the sleeve 162 are evident. In particular, the sleeve 162 allows for interconnecting tubular bodies that otherwise could not be connected unless mechanical fastening devices were employed. Moreover, expensive mandrel tooling is not required during the molding of the interconnecting cuff 160.

Based upon the foregoing disclosure, it should now be apparent that the method and device described herein will carry out the objects set forth hereinabove. It should also be apparent to those skilled in the art that the method of the present invention can be practiced to manufacture a variety of air ducts and similar articles, such as an integral dust boot, isolator ring and spring seal combinations for suspension systems, having outer connecting means, cuffs or similar members at one or both ends integrally bonded thereto. The methods of the present invention also relate to the manufacture of only the tubular members as well as to the practice of by molding the connecting means onto tubular members, separately formed, in the manner described herein.

It is, therefore, to be understood that any variations evident fall within the scope of the claimed invention and thus, the selection of rubber modified thermoplastics, and thermoplastic elastomers and the shapes of the respective molds and the mandrels can be determined without departing from the spirit of the invention herein disclosed and described. Moreover, the scope of the invention shall include all modifications and variations that may fall within the scope of the attached claims.

What is claimed is:

1. A clean air duct for interconnecting an air filter to a throttle body comprising:

a blow molded tubular body with at least one open end, said open end providing an annular ring which terminates at an inwardly extending lip; and an injection molded connecting means integrally secured to said annular ring and said lip, wherein said inwardly extending lip provides an inner diameter substantially equivalent to an inner diameter of said connecting means, and wherein said annular ring has an inner diameter substantially greater than the inner diameter of the inwardly extending lip.

2. A clean air duct as set forth in claim 1, said tubular body further providing an annular neck, said annular neck having an annular shoulder extending outwardly therefrom, said annular shoulder having said annular ring extending therefrom.

3. A clean air duct as set forth in claim 1, the exterior of said connecting means having an annular recess for receiving an adjustable clamp.

4. A clean air duct as set forth in claim 1, the interior of said connecting means having at least one annular rib.

5. A clean air duct as set forth in claim 1, said connecting means having a tapered opening.

6. A clean air duct as set forth in claim 1, wherein said tubular body comprises a propylene/ethylene propylene diene terpolymer blend.

7. A clean air duct as set forth in claim 1, wherein said connecting means comprises a thermoplastic elastomer.

8. A clean air duct, comprising:

a plurality of tubular bodies, each said tubular body having a pair of opposed ends, at least one of said opposed ends of each said tubular body having an annular ring which terminates at an inwardly extending lip; and a cuff integrally connecting said annular rings and said inwardly extending lips wherein said annular ring has an inner diameter substantially greater than an inner diameter of said inwardly extending lip.

9. The clean air duct as set forth in claim 8, wherein said inwardly extending lips provide an inner diameter substantially equivalent to an inner diameter of said cuff.

10. The clean air duct as set forth in claim 8, wherein said inwardly extending lips from opposed annular rings are spaced apart.

11. The clean air duct as set forth in claim 8, further comprising:

a sleeve having an outer surface and an inner surface, said sleeve received within each of said opposed ends having said annular ring and said inwardly extending lip, said inwardly extending lips exerting a compressive sealing force on said outer surface.

12. The clean air duct as set forth in claim 11, wherein each said tubular body further comprises:

a first annular shoulder extending from said annular ring;

an annular neck extending from said first annular shoulder; and a second annular shoulder extending from said annular neck, each of said second annular shoulders receiving said sleeve therebetween.

13. The clean air duct as set forth in claim 12, further comprising:

a pair of opposed retaining ends extending from said cuff, each of said opposed retaining ends bearing against one of said first and second annular shoulders.

14. The clean air duct as set forth in claim 8, wherein each of said plurality of tubular bodies is made of a dissimilar polymeric material.

15. A clean air duct, comprising:

a plurality of tubular bodies, each said tubular body having a pair of opposed ends, at least one of said opposed ends of each said tubular body having an annular ring which terminates at an inwardly extending lip;

a cuff connecting said annular rings and said inwardly extending lips; and a sleeve having an outer surface and an inner surface, said sleeve received within each of said opposed ends having said annular ring and said inwardly extending lip, said inwardly extending lips exerting a compressive sealing force on said outer surface.

16. The clean air duct as set forth in claim 15, wherein said inwardly extending lips from opposed annular rings are contiguous.

* * * * *